(12) United States Patent
Lee (10) Patent No.: US 9,862,260 B2
(45) Date of Patent: Jan. 9, 2018

(54) POWERTRAIN FOR VEHICLE (71) Applicant: Hyundai Motor Company, Seoul (KR)

(72) Inventor: Kyung Shin Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 16 days.

(21) Appl. No.: 15/097,849

(22) Filed: Apr. 13, 2016

(65) Prior Publication Data
US 2017/0136868 A1 May 18, 2017

(30) Foreign Application Priority Data

Nov. 18, 2015 (KR) .......................... 10-2015-0161832

(51) Int. Cl.
| | |
|---|---|
| *B60K 6/365* | (2007.10) |
| *B60W 20/15* | (2016.01) |
| *B60K 6/387* | (2007.10) |
| *B60K 6/543* | (2007.10) |
| *F16H 3/72* | (2006.01) |

(Continued)

(52) U.S. Cl.
CPC .............. *B60K 6/365* (2013.01); *B60K 6/387* (2013.01); *B60K 6/48* (2013.01); *B60K 6/543* (2013.01); *B60W 20/10* (2013.01); *B60W 20/15* (2016.01); *F16H 3/728* (2013.01); *B60K 2006/381* (2013.01); *B60W 10/02* (2013.01); *B60W 10/06* (2013.01); *B60W 10/08* (2013.01); *B60W 10/105* (2013.01); *B60W 20/00* (2013.01); *B60W 2720/406* (2013.01); *B60Y 2200/92* (2013.01); *B60Y 2300/182* (2013.01); *B60Y 2400/73* (2013.01); *Y10S 903/91* (2013.01); *Y10S 903/914* (2013.01); *Y10S 903/918* (2013.01)

(58) Field of Classification Search
CPC .............................. B60K 6/365; B60K 6/387
See application file for complete search history.

(56) References Cited

U.S. PATENT DOCUMENTS 5,168,946 A * 12/1992 Dorgan .................... B60K 1/02
  475/5
8,597,146 B2    12/2013 Holmes et al.
(Continued)

FOREIGN PATENT DOCUMENTS

| | | |
|---|---|---|
| JP | 2014-209012 A | 11/2014 |
| KR | 2009-0132758 A | 12/2009 |

(Continued)

*Primary Examiner* — Derek D Knight
(74) *Attorney, Agent, or Firm* — Morgan, Lewis & Bockius LLP (57) ABSTRACT

A powertrain for a vehicle may include a power source, a left motor/generator and a right motor/generator, a left planetary gear set and a right planetary gear set each having a first rotary member connected to the power source, a second rotary member connected to driving wheels, and a third rotary member connected to either the left motor generator or the right motor generator, a brake configured to limit rotation of the first rotary member of each of the left planetary gear set and the right planetary gear set, a left clutch selectively connecting or disconnecting the second rotary member and the third rotary member of the left planetary gear set to or from each other, and a right clutch selectively connecting or disconnecting the second rotary member and the third rotary member of the right planetary gear set to or from each other.

8 Claims, 9 Drawing Sheets (51) Int. Cl.
*B60K 6/48* (2007.10)
*B60W 20/10* (2016.01)
*B60W 10/02* (2006.01)
*B60W 10/06* (2006.01)
*B60W 10/08* (2006.01)
*B60W 10/105* (2012.01)
*B60W 20/00* (2016.01)
*B60K 6/38* (2007.10)

(56) References Cited

U.S. PATENT DOCUMENTS

2004/0176203 A1* 9/2004 Supina .................. B60W 20/30
475/8
2014/0323259 A1 10/2014 Sugiyama et al.

FOREIGN PATENT DOCUMENTS

| KR | 10-2010-0095077 A | 8/2010 |
| KR | 10-1028400 B1 | 4/2011 |
| KR | 2014-0080636 A | 7/2014 |

* cited by examiner

| VEHICLE STATE | MODE (FOR HEV) | | | OPERATION STATE OF PARTS | | | | |
|---|---|---|---|---|---|---|---|---|
| | | | | ENGINE | LMG | RMG | LEFT AND RIGHT CLUTCH | BRAKE |
| STOPPED | ENGINE STARTED | | | OFF → ON | STARTING (OFF) | OFF (STARTING) | OFF | OFF |
| | CHARGING | | | ON | POWER GENERATING (OFF) | POWER GENERATING (OFF) | OFF | OFF |
| DRIVING | EV DRIVING | | | OFF | DRIVING | DRIVING | OFF | ON |
| | HEV DRIVING (ENGINE + MOTOR) | E-CVT | | ON | DRIVING/ POWER GENERATING | DRIVING/ POWER GENERATING | OFF | OFF |
| | | 1:1 고정 | | ON | DRIVING/ POWER GENERATING | DRIVING/ POWER GENERATING | ON | OFF |
| | MODE CHANGED (EV → HEV) | | | OFF → ON | STARTING | STARTING | OFF | OFF |
| | POWER GENERATING DURING DRIVING | FIXED AT 1:1 | | ON | OFF (POWER GENERATING) | POWER GENERATING (OFF) | ON | OFF |
| | CREEPING | | | OFF | DRIVING | DRIVING | OFF | ON |
| BRAKING | REGENERATIVE BRAKING | LOW SPEED | | OFF | POWER GENERATING | POWER GENERATING | OFF | ON |
| | | HIGH SPEED | | OFF | POWER GENERATING | POWER GENERATING | ON | OFF |
| TURNING | TORQUE VECTORING | E-CVT | | ON/OFF | DRIVING/ POWER GENERATING | DRIVING/ POWER GENERATING | OFF | OFF |
| | | UD | | OFF | DRIVING/ POWER GENERATING | DRIVING/ POWER GENERATING | OFF | ON |

POWERTRAIN FOR VEHICLE

CROSS REFERENCE TO RELATED APPLICATION

The present application claims priority to Korean Patent Application No. 10-2015-0161832, filed Nov. 18, 2015, the entire contents of which is incorporated herein for all purposes by this reference.

BACKGROUND OF THE INVENTION

Field of the Invention

The present invention relates to a powertrain for a vehicle and, more particularly, to a powertrain that allows for achieving a hybrid vehicle or an electric vehicle and can perform left-right torque vectoring of a vehicle.

Description of Related Art

In the related art, the driving systems of a hybrid vehicle and an electric vehicle are simple gear systems, so the operation point of an engine or a motor for driving the vehicles depends on the speed of the vehicles. Accordingly, driving at the optimal operating point of an engine or a motor for driving a vehicle is limited, so the improvement of fuel efficiency is limited, and power cannot be transmitted at a high speed due to an upper speed limit of the motor (a limit in durability of a bearing) when the vehicles are driven at a high speed.

Further, it is limited to apply torque vectoring for ensuring stability when a vehicle turns to left and right wheels, so there is also a limit in ensuring stability when a vehicle turns.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a powertrain for a vehicle that allows an engine or a motor supplying power for driving a vehicle to operate at the optimal operating point, allows a vehicle to be driven at a high speed by a motor, and allows torque vectoring of left and right wheels of a vehicle, thereby largely improving the commercial value of a vehicle.

According to various aspects of the present invention, a powertrain for a vehicle may include a power source, a left motor/generator and a right motor/generator, a left planetary gear set and a right planetary gear set each having a first rotary member connected to the power source, a second rotary member connected to driving wheels, and a third rotary member connected to either the left motor generator or the right motor generator, a brake configured to limit rotation of the first rotary member of each of the left planetary gear set and the right planetary gear set, a left clutch selectively connecting or disconnecting the second rotary member and the third rotary member of the left planetary gear set to or from each other, and a right clutch selectively connecting or disconnecting the second rotary member and the third rotary member of the right planetary gear set to or from each other.

In the left planetary gear set and the right planetary gear set, the first rotary member is a sun gear, the second rotary member is a carrier, and the third rotary member is a ring gear.

The power source may be an internal combustion engine, and power from the internal combustion engine may be transmitted through a driving gear disposed on an input shaft connecting the sun gear of the left planetary gear set and the sun gear of the right planetary gear set to each other.

The driving gear may be disposed between the left planetary gear set and the right planetary gear set, and the brake may limit rotation of the input shaft, between the left planetary gear set and the right planetary gear set.

The brake may be disposed between the left planetary gear set and the right planetary gear set to limit the rotation of the input shaft and achieve a compact configuration.

When the engine is started with the vehicle stopped, the engine may be started by operating at least one of the left motor/generator and the right motor/generator with the left clutch, the right clutch and the brake disengaged, and the driving wheels may be stopped by inertia of the vehicle and provide a reaction force to the left planetary gear set and the right planetary gear set.

In an Electric Vehicle (EV) driving mode, the input shaft and the engine may be fixed by disengaging the left and right clutches and engaging the brake and power may be generated by the left motor/generator and the right motor/generator.

In an Electronic Continuously Variable Transmission (E-CVT) mode the left and right clutches and the brake may be disengaged and the engine may be operated, and torque from the left motor/generator and the right motor generator may be a controlled to operate the engine at an optimum operating point and improve fuel efficiency of the vehicle.

The power source may be a motor operated by electricity, and the motor may include a rotor on an input shaft connecting the sun gear of the left planetary gear set and the sun gear of the right planetary gear set to each other.

According to the present invention, it is possible to operate an engine or a motor supplying power for driving a vehicle at the optimal operating point, to drive a vehicle at a high speed using a motor, and to perform torque vectoring of left and right wheels of a vehicle, thereby largely improving the commercial value of a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
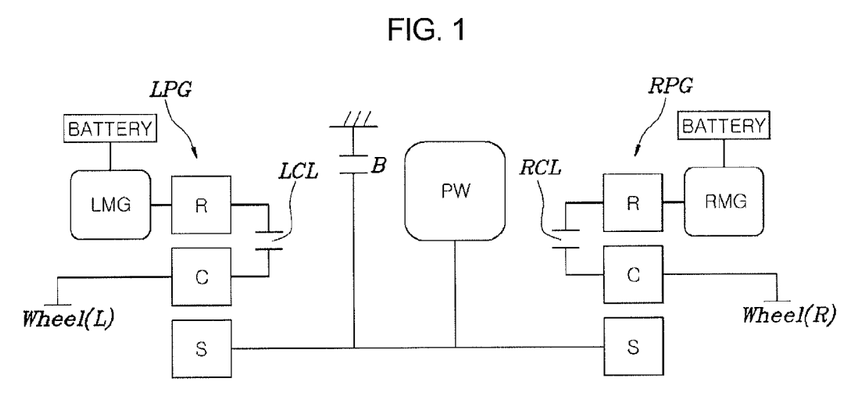
FIG. 1 is a block diagram a powertrain for a vehicle according to the present invention.

Referring to FIG. 1, a powertrain for a vehicle according to various embodiments of the present invention includes a power source PW, a left motor/generator LMG and a right motor/generator RMG, a left planetary gear set LPG and a right planetary gear set RPG each having a first rotary member connected to the power source, a second rotary member connected to driving wheels, and a third rotary member connected to either the left motor/generator LMG or the right motor/generator RMG, a brake B limiting rotation of the first rotary members of the left planetary gear set LPG and the right planetary gear set RPG, a left clutch LCL connecting/disconnecting the second rotary member and the third rotary member of the left planetary gear set LPG to/from each other, and a right clutch RCL connecting/disconnecting the second rotary member and the third rotary member of the right planetary gear set RPG to/from each other.

In various embodiments, in each of the left planetary gear set LPG and the right planetary gear set RPG, the first rotary member is a sun gear S, the second rotary member is a carrier C, and the third rotary member is a ring gear R.

That is, power from the power source PW that is a main part for driving a vehicle is appropriately adjusted and individually supplied to the left and right driving wheels W by the left planetary gear set LPG and right planetary gear set RPG respectively, and the left motor/generator LMG and right motor/generator RMG connected to the planetary gear sets, respectively. Accordingly, an engine E or a motor M that can be used as the power source PW for driving a vehicle can be operated at the optimal operating point, a vehicle can be driven at a high speed by a motor M, and torque vectoring can be applied to the left and right wheels of a vehicle, so the commercial value of a vehicle can be largely improved.

Figure 2:
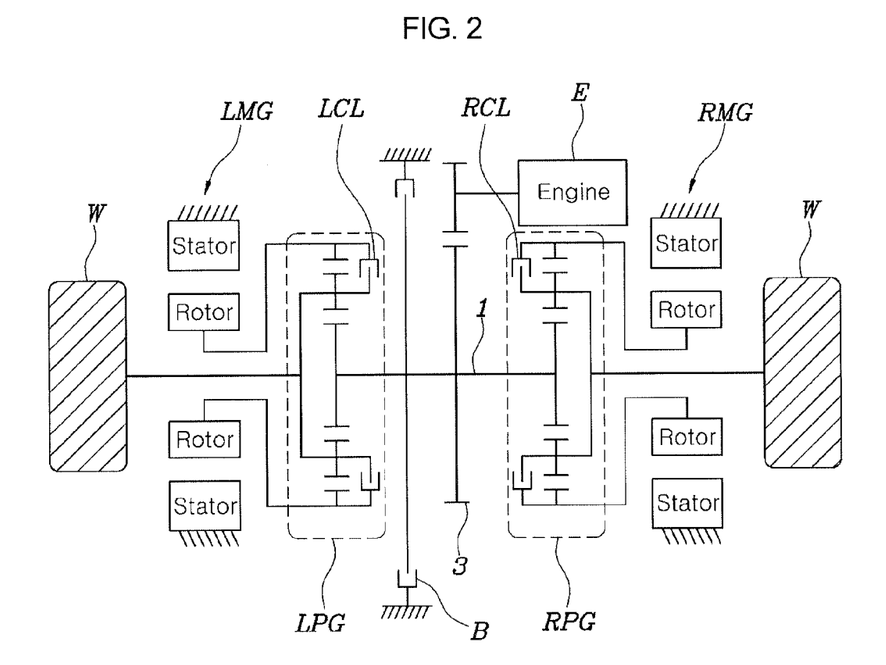
FIG. 2 is a diagram showing in detail an example using an engine as a power source in the powertrain shown in FIG. 1.

FIG. 2 shows an embodiment using an engine E that is an internal combustion engine as the power source PW, in which power from the engine E is transmitted through a driving gear 3 fitted on an input shaft 1 connecting the sun gear S of the left planetary gear set and the sun gear S of the right planetary gear set to each other.

The driving gear 3 is disposed between the left planetary gear set LPG and the right planetary gear set RPG and the brake B is disposed between the left planetary gear set LPG and the right planetary gear set RPG to limit rotation of the input shaft 1 in order to achieve a compact configuration.

Figure 3:
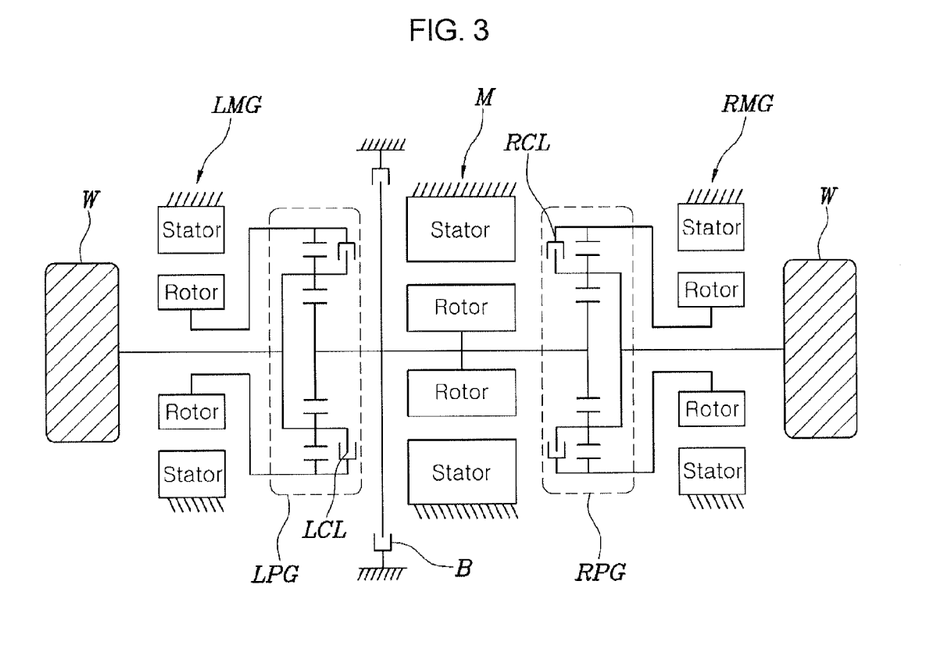
FIG. 3 is a diagram showing in detail an example using a motor as a power source in the powertrain shown in FIG. 1.

FIG. 3 shows various embodiments using a motor M that is electrically operated as the power source PW, in which the motor M is disposed with a rotor on the input shaft 1 connecting the sun gear S of the left planetary gear set LPG and the sun gear S of the right planetary gear set RPG to each other.

Figure 4:
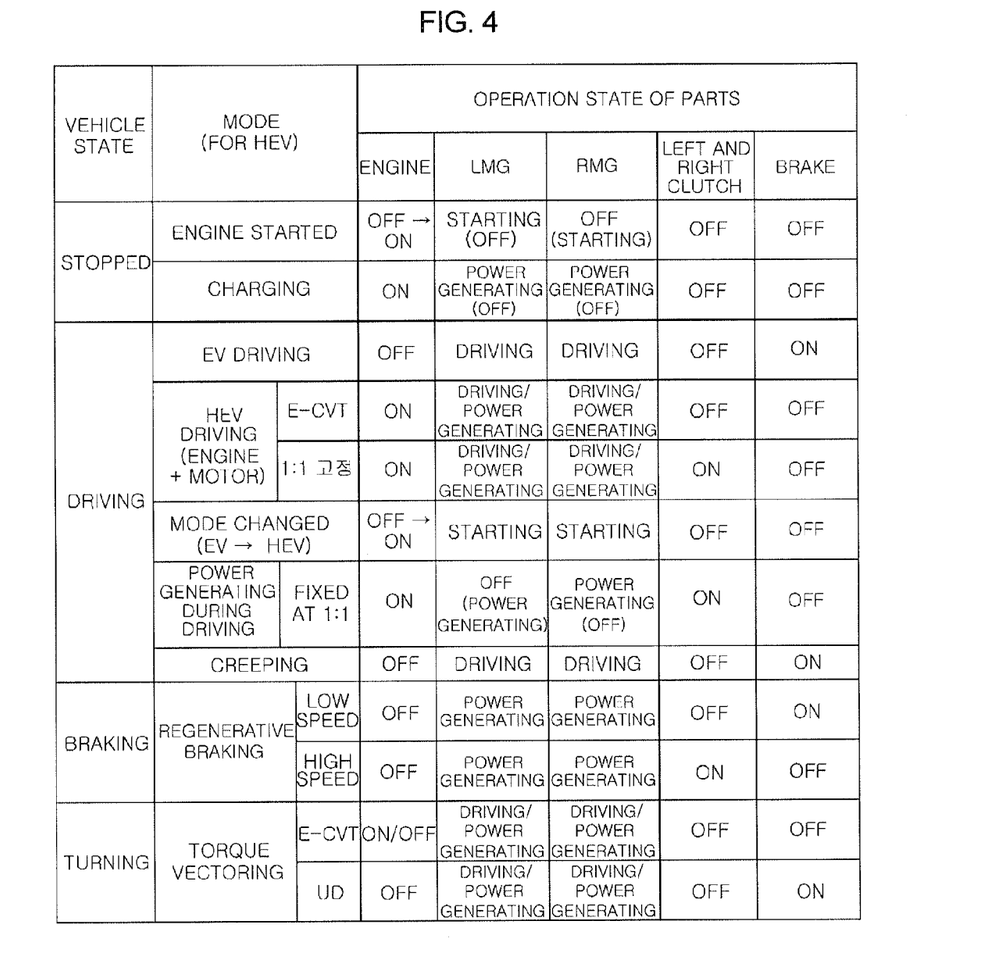
FIG. 4 is a table showing operation modes that are achieved by the powertrain shown in FIG. 2.

Hereinafter, operation modes shown in FIG. 4 will be sequentially described with reference to FIGS. 5 to 16 on the basis of the embodiments shown in FIG. 2 which use an engine E as the power source PW.

Figure 5:
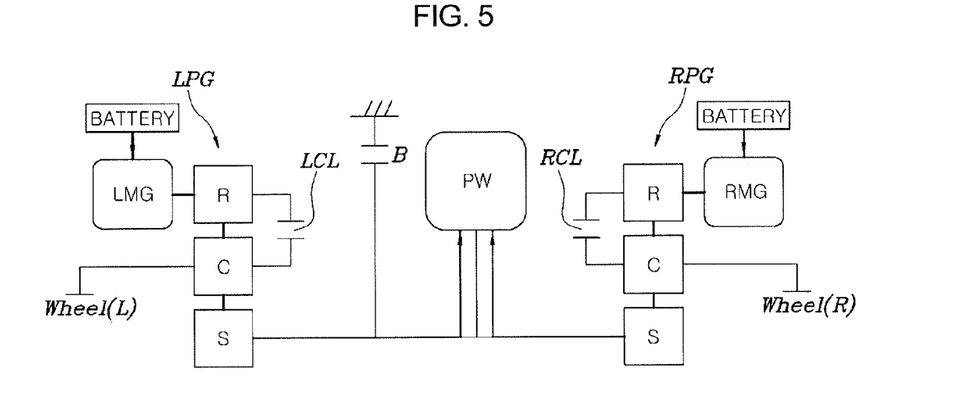
FIG. 5, FIG. 6, FIG. 7, FIG. 8, FIG. 9, FIG. 10, FIG. 11, FIG. 12, FIG. 13, FIG. 14, FIG. 15 and FIG. 16 are diagrams respectively showing the operation modes shown in FIG. 4.

Referring to FIG. 5, which shows a case when the engine E is started with a vehicle stopped, the engine is started by operating both or only one of either the left motor/generator LMG or the right motor/generator RMG with all of the left clutch and right clutch LCL and RCL (hereafter, referred to as 'left/right clutches') and the brake B disengaged, in which the driving wheels W are stopped by inertia of the vehicle and provide a reaction force to the left planetary gear set and the right planetary gear set.

Figure 6:
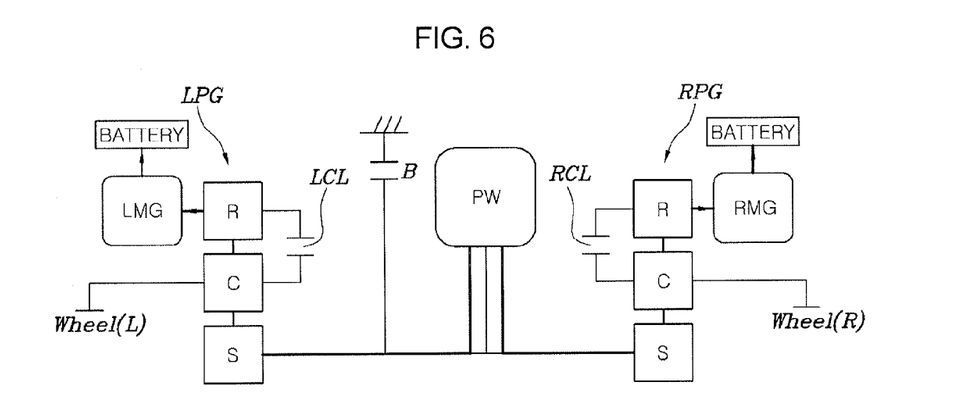

FIG. 6 shows a state when a battery is charged by an engine 1, in which, with the left/right clutches LCL/RCL and the brake B disengaged, the engine 1 is started and the left motor/generator LMG and the right motor/generator RMG are operated by power from the engine E, so electricity is generated.

Figure 7:
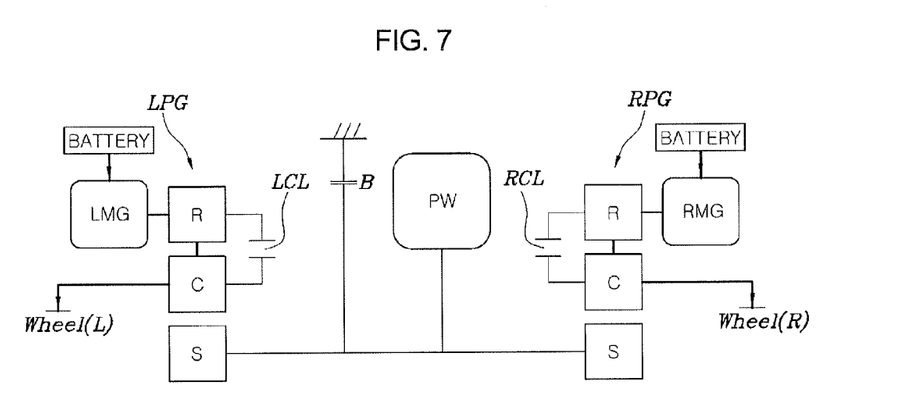

FIG. 7 shows an EV driving mode that is an electric vehicle mode, in which the input shaft 1 and the engine E are fixed by disengaging the left/right clutches LCL/RCL and engaging the brake B and power is generated by the left motor/generator LMG and the right motor/generator RMG, so a vehicle is driven in an EV mode.

Figure 8:
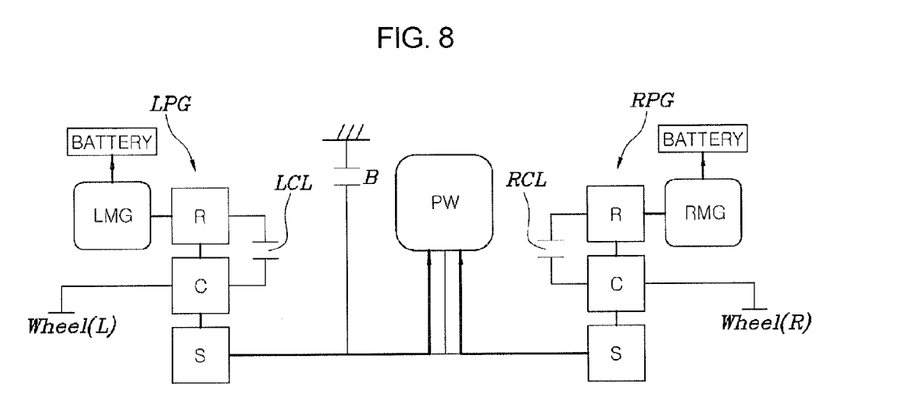

FIG. 8 shows switching from an EV driving mode that is an electric vehicle mode to an Hybrid Electric Vehicle (HEV) driving mode that is a hybrid mode, in which the engine E is started by disengaging the brake B and generating reverse torque from the left motor/generator LMG and the right motor/generator RMG with a vehicle speed over a predetermined level achieved in the EV driving, in which the carriers provide reaction force against the inertia force of the vehicle.

Figure 9:
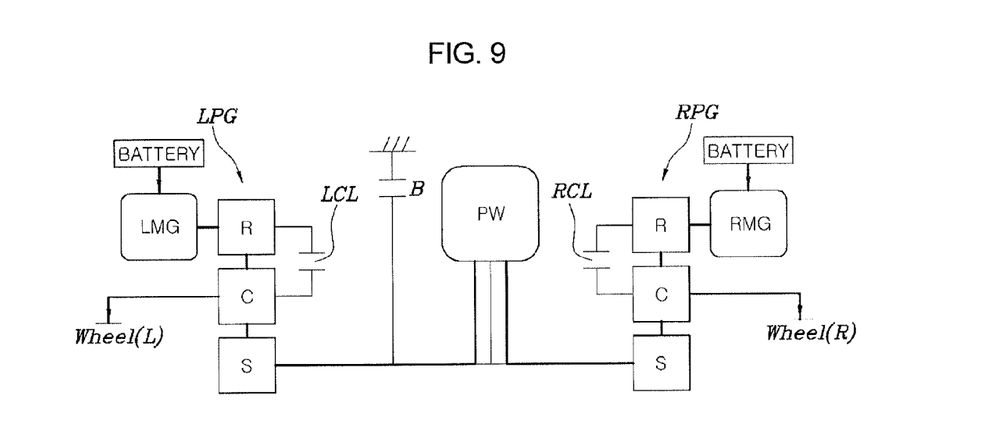

FIG. 9 illustrates a state for implementing an Electronic Continuously Variable Transmission (E-CVT) function that can continuously adjust a gear ratio in an HEV mode that is a hybrid mode.

In this case, with the left and right clutches LCL and RCL and the brake B all disengaged and the engine E operated, torque from the left motor/generator LMG and the right motor/generator RMG is appropriately controlled so that the engine E can be operated at the optimum operating point, thereby improving the fuel efficiency of a vehicle.

Figure 10:
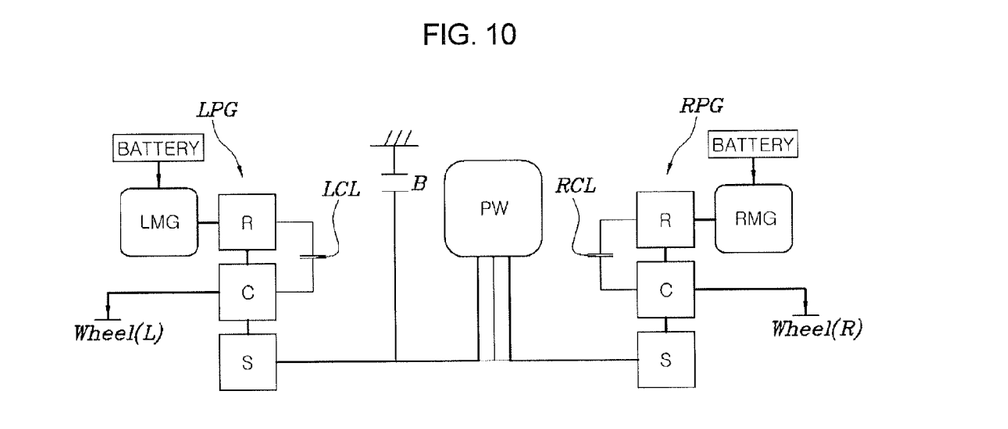

FIG. 10 shows a state of a gear ratio of 1:1 in HEV driving, in which the left and right clutches LCL and RCL are both engaged and the brake B is disengaged.

As the left and right clutches LCL and RCL are engaged, the left planetary gear set LPG and the right planetary gear set RPG are integrally rotated, so the power from the engine E is outputted to the driving wheels W at the same speed without shifting, in which the left motor/generator LMG and the right motor/generator RMG are appropriately control to generate electricity or drive the vehicle in accordance with the driving state of the vehicle.

Figure 11:
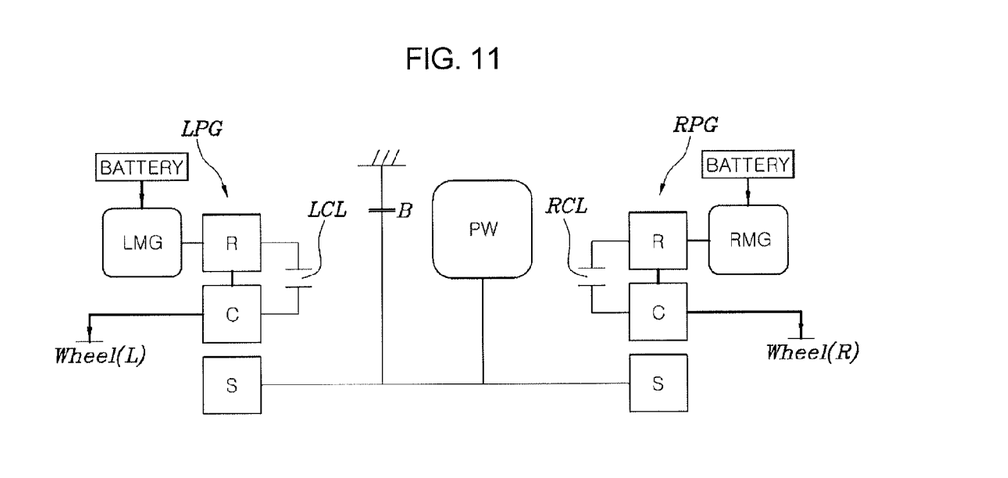

FIG. 11 shows a state of creeping, in which the brake B is engaged, the left and right clutches LCL and RCL are disengaged, the engine is stopped, and the left motor/generator LMG and the right motor/generator RMG are operated to generate power for creeping.

Figure 12:
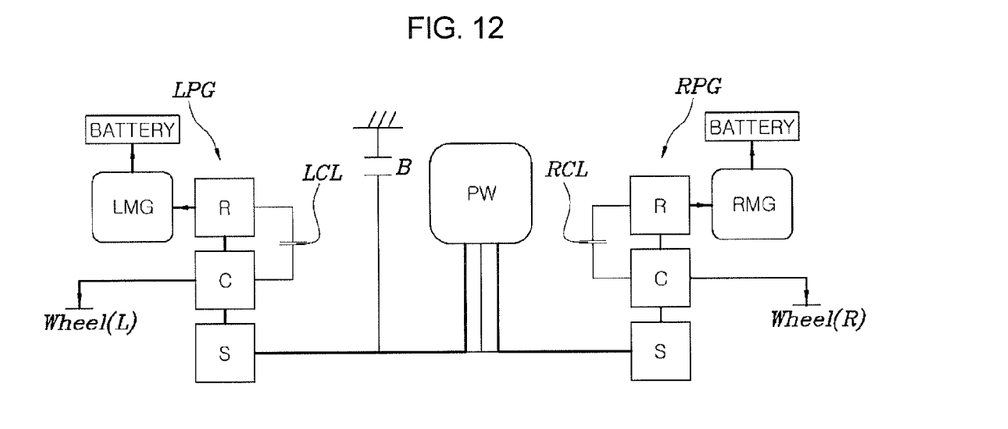

FIG. 12 shows a specific case of generating electricity with a gear ratio of 1:1 while a vehicle is driven, in which the gear ratio of 1:1 is achieved by engaging the left and right clutches LCL and RCL, the vehicle is driven by the power from the engine E, and the left motor/generator LMG and the right motor/generator RMG generate electricity to charge the battery.

Figure 13:
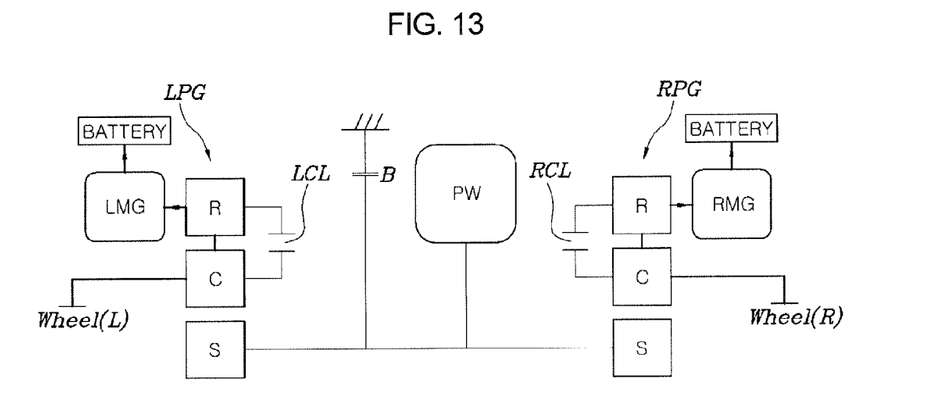
Figure 14:
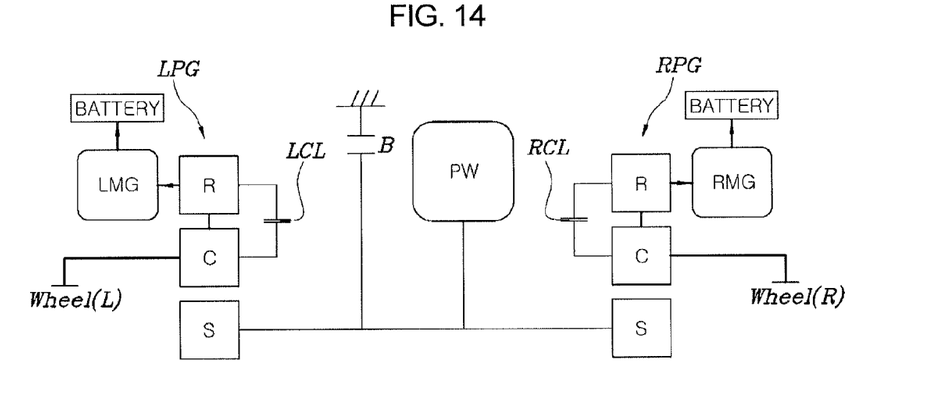

FIGS. 13 and 14 show regenerative braking. FIG. 13 shows low-speed regenerative braking with the brake engaged and the left and right clutches disengaged and FIG. 4 shows high-speed regenerative braking with the left and right clutches engaged and the brake disengaged.

In FIG. 13, power from the driving wheels is increased by the left planetary gear set LPG and the right planetary gear set RPG and operates the left motor/generator LMG and the right motor/generator RMG, thereby performing regenerative braking. In FIG. 14, power from the driving wheels W directly operates the left motor/generator LMG and the right motor/generator RMG without shifting, thereby performing regenerative braking.

Figure 15:
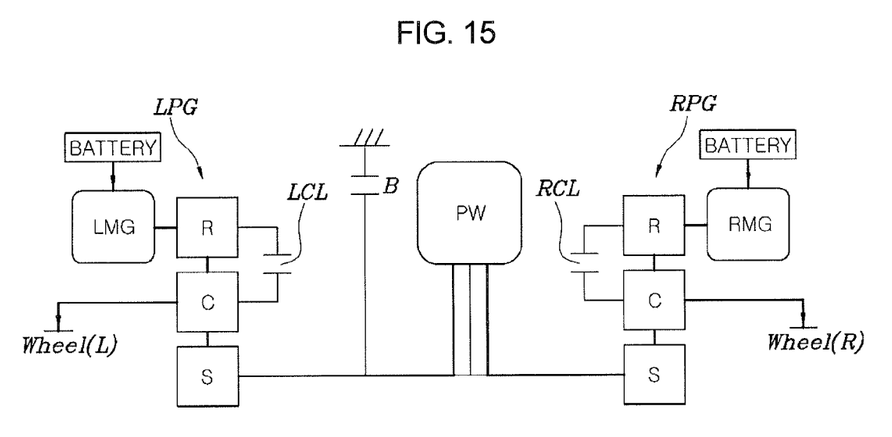

FIG. 15 illustrates high-speed torque vectoring, in which the left and right clutches LCL and RCL and the brake B are all disengaged and torque is distributed to the left and right driving wheels W by appropriately and independently controlling the left motor/generator LMG and the right motor/generator RMG to generate electricity and drive the vehicle, respectively, regardless of on/off of the engine E, so stability when the vehicle turns can be ensured.

Figure 16:
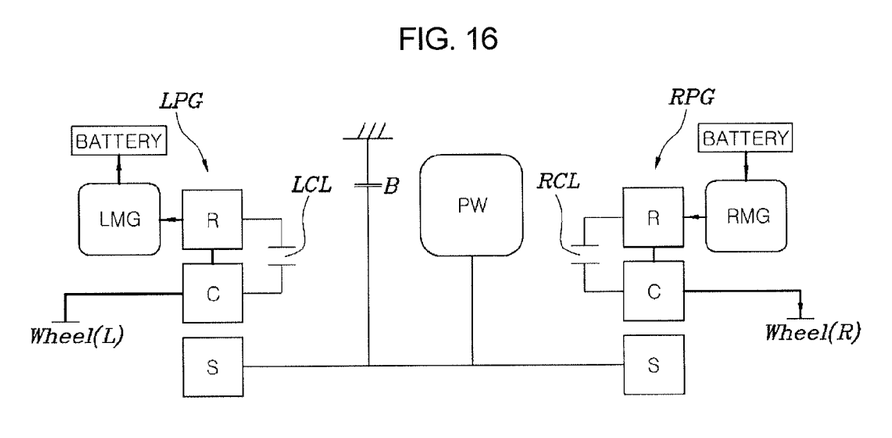

FIG. 16 illustrates low-speed torque vectoring, in which the brake B is engaged, the engine E is stopped, and torque is distributed to the left and right driving wheels W by appropriately and independently controlling the left motor/generator LMG and the right motor/generator RMG to generate electricity and drive the vehicle, respectively, so stability when the vehicle turns can be ensured.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain for a vehicle, comprising:
   a power source;
   a left motor/generator and a right motor/generator;
   a left planetary gear set and a right planetary gear set each having a first rotary member connected to the power source, a second rotary member connected to driving wheels, and a third rotary member connected to either the left motor generator or the right motor generator;
   a brake configured to limiting rotation of the first rotary member of each of the left planetary gear set and the right planetary gear set;
   a left clutch selectively connecting or disconnecting the second rotary member and the third rotary member of the left planetary gear set to or from each other; and
   a right clutch selectively connecting or disconnecting the second rotary member and the third rotary member of the right planetary gear set to or from each other,
   wherein in the left planetary gear set and the right planetary gear set, the first rotary member is a sun gear, the second rotary member is a carrier, and the third rotary member is a ring gear.

2. The powertrain of claim 1, wherein the power source comprises an internal combustion engine, and power from the internal combustion engine is transmitted through a driving gear disposed on an input shaft connecting the sun gear of the left planetary gear set and the sun gear of the right planetary gear set to each other.

3. The powertrain of claim 2, wherein the driving gear is disposed between the left planetary gear set and the right planetary gear set, and the brake limits rotation of the input shaft, between the left planetary gear set and the right planetary gear set.

4. The powertrain of claim 2, wherein the brake is disposed between the left planetary gear set and the right planetary gear set to limit the rotation of the input shaft and achieve a compact configuration.

5. The powertrain of claim 2, wherein when the engine is started with the vehicle stopped, the engine is started by operating at least one of the left motor/generator and the right motor/generator with the left clutch, the right clutch and the brake disengaged, and the driving wheels are stopped by inertia of the vehicle and provide a reaction force to the left planetary gear set and the right planetary gear set.

6. The powertrain of claim 2. wherein in an Electric Vehicle (EV) driving mode, the input shaft and the engine are fixed by disengaging the left and right clutches and engaging the brake and power is generated by the left motor/generator and the right motor/generator.

7. The powertrain of claim 2. wherein in an Electronic Continuously Variable Transmission (E-CVT) mode the left and right clutches and the brake are disengaged and the engine is operated, and torque from the left motor/generator and the right motor generator is a controlled to operate the engine at an optimum operating point and improve fuel efficiency of the vehicle.

8. The powertrain of claim 1, wherein the power source is a motor operated by electricity, and the motor includes a rotor on an input shaft connecting the sun gear of the left planetary gear set and the sun gear of the right planetary gear set to each other.

* * * * *